May 8, 1945.                R. D. MOORE                    2,375,677
                     VEHICLE HEADLIGHT CONTROL
                        Filed Jan. 14, 1942
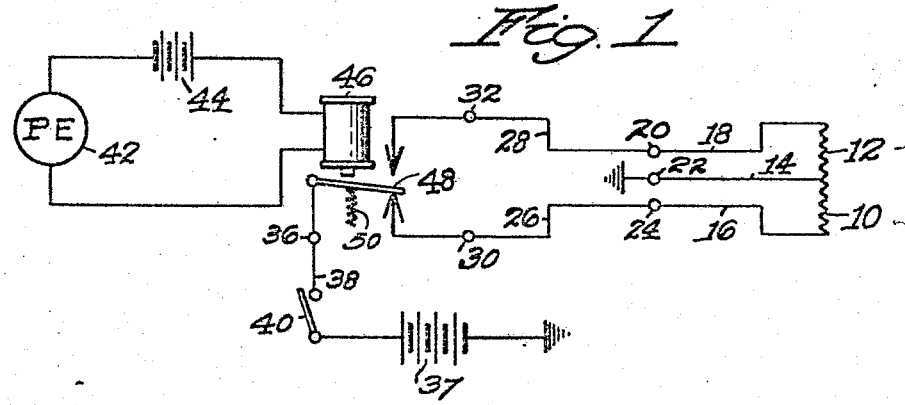
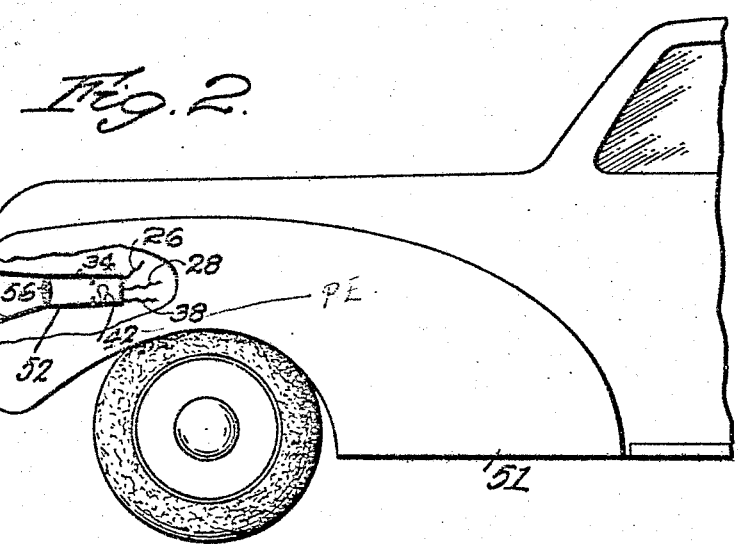
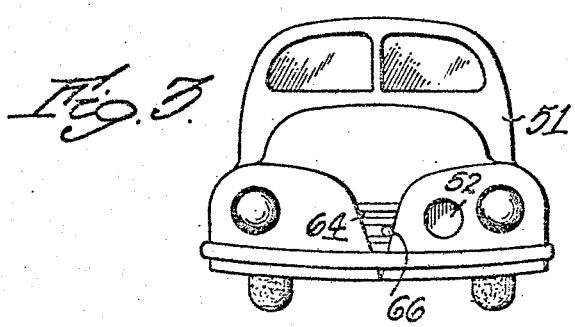

Patented May 8, 1945

2,375,677

UNITED STATES PATENT OFFICE 2,375,677

VEHICLE HEADLIGHT CONTROL

Raymond D. Moore, Worcester, Mass.

Application January 14, 1942, Serial No. 426,728

5 Claims. (Cl. 315—83)

This invention relates to devices for automatically switching from one beam to the other of two or double filament headlights as now used on motor vehicles, the switching being controlled by a photo-electric cell in response to the lights of oncoming traffic only.

Objects of the invention include the provision of an automatic switching device to throw the vehicle battery current through the low filament of a double filament headlight upon and only upon the approach of oncoming traffic having headlights burning, the device being effective to normally maintain the high filament in on position regardless of sunlight, overhead street lights, side lights, etc.; there being included in the system the ordinary dash board control switch to turn the headlights off for daylight driving.

Other objects include the provision of a unitary photo-electric control device which is mountable on any present motor vehicle and may be connected to the headlight wiring system to achieve the automatic filament control recited above, so that the novel system need not be originally built into the vehicle, although it may be applied to the vehicle at the factory while it is being assembled if desired.

Further objects include the provision of a relatively simple but effective device of the nature described which comprises a relay arranged so that the high filament of a double filament headlight is maintained in condition to be lighted by mechanical means for normal driving, and the low filament is held in its operative condition by the relay upon approach of a vehicle having its headlights on, said relay being operated by a high voltage low current battery, whereby said battery will normally be inactive and hence will have only a small drain applied thereto; and the provision of a simple and comparatively inexpensive switching system for the purpose described.

Other objects and advantages of the invention will appear hereinafter.

Reference is to be had to the accompanying drawing, in which:

Fig. 1 is a diagram illustrating the electrical layout for the invention;

Fig. 2 is a side view illustrating the location of the photo-electric unit in the vehicle body; and Fig. 3 is a front view of a vehicle equipped with the device.

The double filament or "Twin-Beam" headlight comprises a high resistance or bright filament 10 and a low or dim filament 12 connected by a ground contact 14, and having power contacts 16 and 18 respectively. It is contemplated that contacts 14, 16, 18 will be made in a single unit with the headlight, and elements 20, 22, 24 represent the headlight socket power and ground contacts relative to which the headlight is easily applied and removable therefrom. It is thought that it is not necessary to illustrate the mechanical details of the headlight or its socket as these do not affect the invention so long as they conform to the disclosure of the circuit herein.

In this application the permanent vehicle wiring to a single headlight socket comprises wires 26, 28, and elements 30, 32 represent binding posts or snap contacts on a light-sensitive cell-supporting housing 34 for attachment of wires 26, 28. Numeral 36 represents a third binding post or contact on housing 34, and all the elements between contacts 30, 32 on one hand and contact 36 on the other hand may be conveniently mounted in the housing, and the vehicle wiring may be attached to the three binding posts as illustrated.

Contact 36 is adapted to connect the conventional vehicle 6-volt battery 37 to the light sensitive unit 34 by wire 38 leading from the manual dash board switch 40. Battery 37 may be grounded as shown or otherwise operatively connected to the socket ground contact 22.

The light sensitive device here illustrated comprises a photo-electric cell 42 which preferably embodies an amplifier tube as usual, a high voltage dry battery 44, and a relay 46 all connected as shown and mounted in housing 34. The pivoted relay arm 48 is normally maintained in electrical contact with contact 30 by a spring 50; but energization of the relay coil will break this contact and shift the arm 48 over into electrical contact with contact 32. However, neither filament of the headlight will burn as long as dash switch 40 is open.

Figs. 2 and 3 illustrate a preferred mounting and location for the light sensitive device in a vehicle body 51, the permanent wiring being omitted in detail as this may be located as convenient. A long tapered tube 52 is fastened horizontally on the vehicle body in such a way as to face forwardly of the vehicle with the wider end of the tube being open or glassed in. This tube may be inserted in the body as shown, or it may be fastened by convenient means to any surface of the vehicle as long as it faces forwardly thereof.

The open end of tube 52 may be provided with a downwardly inclined lower surface 54, but the upper surface should be horizontal or at most only slightly inclined upwardly. Approximately centrally of the tube a magnifying lens 56 is vertically mounted, and at the rear end of the tube the housing 34 is located so that the photoelectric cell 42 will lie at the point of convergence of light rays condensed by the lens. An aperture is provided in housing 34 for the entrance of the light rays into the housing to fall on the cell.

Fig. 2 shows vehicle wires 26, 28, and 33 entering the housing, and once having located the latter correctly with respect to the tube 52 and lens 56, it is merely necessary to connect the wires to the binding posts in the housing and the apparatus is set for operation.

As long as light rays do not directly enter the open end of tube 52 so as to fall on lens 56, the system will be at rest with relay arm 48 mechanically maintained in contact with the high or bright side of the headlight, this condition being shown in Fig. 1, and this condition will be maintained whether the dash switch 40 is open or closed. Therefore, during daylight driving there will be no drain on battery 44, due to the recessed nature of lens 56. The sun's rays will not fall on the lens unless the sun is just about on the horizon and the vehicle directly faces it. Also side lights of whatever nature cannot fall on the lens, and the only actuation of the device possible is from lights dead ahead of the vehicle. Inasmuch as most vehicle lights are directed slightly downwardly, the inclined surface 54 will help to reflect the same into the lens 56, but this effect is only additive to a direct light beam on the lens and in and of itself would not affect the cell.

However, when a strong light beam falls on lens 56, it will be condensed and transmitted to the cell 42, and in this case the well known properties of the cell are utilized to close the circuit for battery 44 to energize the relay, thus swinging the relay arm to break contact with the high filament 10 and into contact with contact 32 for low filament 12. Obviously this action is not dependent on whether the dash switch 40 is open or closed, so that if the switch 40 is closed when a light ray is impressed on the cell, the relay will be already set to turn on the low filament.

Battery 44 may be of a low amperage type having long life and will not have to be replaced until after months of service, but when it fails, it is merely necessary to disconnect it from the cell circuit and insert a new one, and the same is true of the cell itself and all other parts. This invention will be seen to greatly simplify devices of this nature, and the construction is particularly devised for use with the double-beam headlight. Only one headlight has been shown in the diagram, but obviously other lamps may be connected in parallel with wires 26, 28, and by using contact 22, no special means is needed to ground the headlight filaments.

It will be clear from the above disclosure that a very simple and easily serviced switching arrangement has been devised wherein the battery 44 will be drained only upon the presence of lights dead ahead of the vehicle, and that in ordinary circumstances the apparatus will not be affected by sunlight or side lighting. Also, all special equipment, such as complicated dash switches, is done away with except for the unit housing the cell, battery 44, and relay 46, since the conventional vehicle wiring already present in commercial vehicles may be utilized, including the conventional dash switch and vehicle battery, so that the invention may be applied to any vehicle merely by attaching the tube and cell units and hooking up the wires as shown, and incidentally, a transformer and rectifier system could be substituted for battery 44.

This invention also contemplates that in many instances it would be preferable to apply a shutter 60 to the open end of tube 52 to provide a closure for daylight driving. This shutter acts as a door to prevent ingress of light, and may be hinged at 62 and operated manually by a rod or other convenient mechanism from the dash board. The shutter will tend to prevent the accumulation of ice and snow in the tube even when open.

Many variations may be embodied in the details of the invention, as for instance it is not necessary to use a tube as large as that shown in the drawing, but a small Lucite rod could be placed in the radiator grille 64 as at 66 and of course such a rod is capable of being bent to conduct light rays to any convenient point for the location of the photo-electric cell. In this case, heat from the radiator would keep the light entrance end of the Lucite rod clear of snow, sleet and ice. Also, of course, tube 52 itself may be placed adjacent the radiator if desired or convenient.

Having thus described my invention and the advantages thereof, I do not wish to be limited to the details herein disclosed, otherwise than as set forth in the claims, but what I claim is:

1. In an apparatus of the class described, the combination of a vehicle headlight having multiple power contacts and a ground contact with a light sensitive cell unit remote from the headlight and comprising a photo-electric cell adapted to be energized to pass electric current only in the presence of a beam of light; a power source, and a relay; said relay having connection with the vehicle battery, a dash board switch between the vehicle battery and relay, an electric connection between each of said power contacts and the opposite sides of said relay, resilient means normally maintaining said relay in position to connect said vehicle battery and one of said power contacts whereby a beam of light falling on said cell causes an electric current generated in the cell to automatically shift the relay to energize the other power contact and disconnect the said one power contact, means shielding said cell from overhead light rays, and a magnifying lens mounted in said last named means to condense light falling on said lens and direct it to the sensitive cell.

2. An apparatus as recited in claim 1 wherein said shielding means comprises a tube or the like enclosing said lens.

3. In an apparatus of the class described, the combination of a vehicle headlight having multiple power contacts and a ground connection, with a closed housing remote from the headlight and mounted on a vehicle body, a photoelectric cell, power source, and relay all connected in series and mounted in said housing, an arm in said relay shiftable between said power contacts, mechanical means normally maintaining said arm in contact with one only of said power contacts, a vehicle battery connected by a wire to said relay arm, a manual switch in said wire, said housing having an aperture in position to admit a beam of light thereinto only from directly in front of said vehicle onto said cell for shifting said relay arm to connect one contact to said battery while the other contact therefrom, and means extending forwardly of the housing to shield the aperture from light sources above and to the sides of the same.

4. An apparatus as recited in claim 3 including a light condensing lens in said housing, and said last named means including an enclosed tubular element connecting the lens and housing, and extending forwardly of the lens.

5. An apparatus as recited in claim 3 wherein said last named means includes a tube extending forwardly of said housing from said aperture, said tube being open at one end for receiving light rays, and a light condensing lens intermediate the open end of the tube and said aperture, said lens being spaced a substantial distance from the open end of the tube.

RAYMOND D. MOORE.